United States Patent [19]
McGinley

[11] 4,263,334
[45] Apr. 21, 1981

[54] WATER DISPERSIBLE CELLULOSIC POWDER AND METHOD OF MAKING THE SAME

[75] Inventor: Emanuel J. McGinley, Morrisville, Pa.

[73] Assignee: FMC Corporation, Philadelphia, Pa.

[21] Appl. No.: 8,672

[22] Filed: Feb. 2, 1979

Related U.S. Application Data

[63] Continuation-in-part of Ser. No. 911,658, May 31, 1978, abandoned.

[51] Int. Cl.³ .............................................. A23L 1/04
[52] U.S. Cl. .................................. 426/573; 426/654; 426/565
[58] Field of Search ............... 426/565, 566, 567, 654, 426/573

[56] References Cited

U.S. PATENT DOCUMENTS

| 3,726,690 | 4/1973 | Schuppner | 426/654 |
| 3,800,036 | 3/1974 | Gakky | 426/566 |
| 3,914,440 | 10/1975 | Witzig | 426/565 |
| 3,914,441 | 10/1975 | Finney et al. | 426/567 |
| 3,993,793 | 11/1976 | Finney | 426/654 |

Primary Examiner—Jeanette M. Hunter
Attorney, Agent, or Firm—Charles H. Johnson

[57] ABSTRACT

A water-dispersible powder useful as a stabilizing agent and for enhancing the body and texture of frozen dairy type foods is disclosed as having individual particles comprising beta-1,4 glucan co-dryed with a carbohydrate sweetener and a hydrocolloid gum.

4 Claims, No Drawings

WATER DISPERSIBLE CELLULOSIC POWDER AND METHOD OF MAKING THE SAME

This application is a continuation-in-part of application Ser. No. 911,658 filed May 31, 1978, now abandoned.

This invention relates to a water-dispersible cellulosic powder useful as a stabilizing agent in a variety of products and being especially useful as a stabilizing agent which also enhances body and texture of frozen dairy type comestibles such for example as ice cream, ice milk, frozen yogart and the like.

U.S. Pat. No. 3,539,365 discloses a cellulosic powder capable of forming a stable, thixotropic gel. The powder particles of said patent comprise beta-1,4 glucan having intimately associated therewith a small amount of a specific form of sodium carboxymethyl cellulose (CMC). This powder has been used extensively in a variety of products for a variety of purposes, including use as a stabilizing agent in ice cream, ice milk and the like. However, in some countries, notably Japan and a number of western European countries, the use of CMC in food products is objectionable. The prior art, including U.S. Pat. No. 3,539,365, suggests employing various other materials such as gums, sugars, and other things in place of the CMC in assocation with beta-1,4 glucan. However, said other materials when used individually with beta-1,4 glucan particles do not perform all the functions of the CMC described in U.S. Pat. No. 3,539,365 and do not provide a powder capable of functioning as well as a stabilizing agent for frozen dairy type foods as does the powder described in said patent.

It is a primary object of this invention to provide a cellulosic powder capable of forming a colloidal dispersion of beta-1,4 glucan particles, which powder is capable of functioning as a stabilizing agent and also of enhancing the body and texture of frozen dairy type foods in much the same manner as the powder of the above-referred to U.S. Pat. No. 3,539,365 but without including CMC as a component of the powder. As will become apparent, this objective is obtained by associatiing with disintegrated beta-1,4 glucan particles a combination of two additives, namely, a carbohydrate sweetener and a hydrocolloid gum. It will also be pointed out that the best results are obtained when particular sweeteners and particular hydrocolloids are employed in particular amounts.

As explained in U.S. Pat. No. 3,539,365, the beta-1,4 glucan may be derived by any desired chemical degradation method applied to a selected cellulose material. Upon completion of the desired degradation, the residue is collected as a filter cake and is thoroughly washed to remove soluble impurities. The washed cake, preferably containing about 40% solids, is then subjected to mechanical disintegration. In the chemical degradation treatment and subsequent washing, microcrystalline cellulose is freed by cleaving the cellulose chains in the amorphous regions but the individual crystallites still remain bound together due to hydrogen bonding. These individual crystallites must be separated or peeled from the treated fiber or fragment. During the disintegration, newly created surfaces are formed as the microcrystals are separated from the degraded material and unless the individual microcrystals are maintained in a separated condition they will re-bond. In order to obtain an efficient shearing, the solids content of the mass being subjected to disintegration should be sufficiently high to provide an efficient transfer of the sheer forces. On the other hand, the solids content should not be so high as to allow the separated microcrystals to coalesce and form large aggregates owing to insufficient water present to hydrate with the newly created surfaces of the microcrystals.

The mechanical attrition may be effected by the use of various standard equipment such as kitchen mixers, planetary mixers, ball mills, attrition mills, high-speed shearing devices, such as a Waring Blendor and the like. Also, the residue of the hydrolysis treatment preferably in the presence of an aqueous medium may be subjected to a shearing action and to a rubbing action between the particles by forcing the mixture of residue and aqueous medium through passages of limited cross-section such as found in perforated plates. The attrition should be sufficient to produce a mass wherein at least about 1% by weight and preferably at least 30% of the particles have an average length not greater than about 1.0 micron as determined by electron microscopic examination. Some of the particles in such a mass may have a length or maximum dimension as low as a few hundredths of a micron.

For practical purposes, it is, of course, desired to dry the attrited material. However, the dried product becomes hornified probably due to agglomeration of numbers of smaller particles that become bonded together by hydrogen bonding forces during drying. These forces are second in strength only to primary valence bonds and accordingly, when the dried product is to be redistributed in an aqueous medium, substantial amounts of energy are required to break the hydrogen bonds. In order to prevent this hydrogen bonding, Durand et al., in U.S. Pat. No. 3,539,365, suggest coating the beta-1,4 glucan particles with a barrier material and the patent mentions a variety of materials useful for this purpose and indicates a particular form of CMC as being the most effective. According to the present invention the use of CMC is avoided and in its place a combination of additives consisting of a carbohydrate sweetener and a hydrocolloid gum are employed. These materials may be associated with the beta-1,4 glucan in the same way that the CMC is associated with the beta-1,4 glucan in U.S. Pat. No. 3,539,365, as will later be referred to in more detail.

As previously mentioned, this invention is aimed at providing a cellulosic powder not only capable of forming a colloidal dispersion of beta-1,4 glucan particles but of providing such a dispersion capable of improving both body and texture of frozen dairy type food, and also being useful in other areas. It has been found that by associating with the beta-1,4 glucan particles a single additive of various gums other than CMC a good body can be imparted to a frozen dairy type food but the texture is coarse, icy and totally lacking in heat shock resistance. Microscopic analysis of the beta-1,4 glucan/hydrocolloid gum dispersion in the frozen product revealed an incompleted dispersion of beta-1,4 glucan microcrystals in every case and in many cases destabilization of the dairy emulsion was apparent. The hydrocolloid gums studied included guar gum, locust bean gum, gum arabic, sodium alginate, propylene glycol aliginate, carrageenan, gum karaya and xanthan.

In addition to associating a single gum additive with the beta-1,4 glucan, single sweeteners were associated with the beta-1,4 glucan; particularly carbohydrate sweeteners such as sucrose, dextrose and hydrolized cereal solids (HCS). When the foregoing beta-1,4 glucan/carbohydrate sweetener compositions were employed in a typical ice milk formulation it was found that dispersion of the beta-1,4 glucan microcrystals was much improved over the beta-1,4 glucan/hydrocolloid gum compositions. The hydrolized cereal solids were found to produce the best results. However, even though these formulations resulted in improved dispersion of the beta-1,4 glucan particles and also in improved texture of the frozen dairy type product, the body of the product was not appreciably improved.

Even though no one additive other than CMC, either a gum or a carbohydrate sweetener, gave fully satisfactory results when used as a component of a frozen dairy type product, it has been found that certain three-component systems give excellent results. The key to the three-component system is the carbohydrate sweetener additive which allows dispersibility of the beta-1,4 glucan microcrystals in conjunction with a variety of hydrocolloid gums. Thus, the beta-1,4 glucan functionality can be utilized in combination with various diverse properties of the gums.

Certain three-component beta-1,4 glucan, carbohydrate sweetener and hydrocolloid gum compositions have been found to be very effective as a stabilizing agent and in improving both body and texture of frozen dairy type foods. Certain compositions which have been found to be effective are as follows, wherein the numbers indicate parts or percentages by weight:

| | | |
|---|---|---|
| 60 beta-1,4 glucan | 30 HCS | 10 Guar Gum |
| 60 beta-1,4 glucan | 30 HCS | 10 Sodium Alginate |
| 60 beta-1,4 glucan | 30 HCS | 10 Carrageenan |
| 60 beta-1,4 glucan | 30 HCS | 10 Locust Bean Gum |
| 60 beta-1,4 glucan | 30 HCS | 10 Gum Arabic |
| 60 beta-1,4 glucan | 30 HCS | 10 Karaya Gum |
| 60 beta-1,4 glucan | 30 HCS | 10 Propylene Glycol Alginate |
| 70 beta-1,4 glucan | 25 HCS | 5 Xanthan Gum |
| 70 beta-1,4 glucan | 20 HCS | 10 Xanthan Gum |
| 80 beta-1,4 glucan | 10 HCS | 10 Xanthan Gum |
| 60 beta-1,4 glucan | 35 HCS | 5 Xanthan Gum |
| 60 beta-1,4 glucan | 30 HCS | 10 Xanthan Gum |
| 60 beta-1,4 glucan | 30 Sucrose | 10 Xanthan Gum |
| 50 beta-1,4 glucan | 45 Sucrose | 5 Xanthan Gum |
| 50 beta-1,4 glucan | 40 Sucrose | 10 Xanthum Gum |
| 60 beta-1,4 glucan | 35 Dextrose | 5 Guar Gum |
| 60 beta-1,4 glucan | 30 Dextrose | 10 Guar Gum |
| 60 beta-1,4 glucan | 35 Dextrose | 5 Xanthan Gum |
| 60 beta-1,4 glucan | 30 Dextrose | 10 Xanthan Gum |
| 40 beta-1,4 glucan | 55 HCS | 5 Xanthan Gum |
| 30 beta-1,4 glucan | 65 HCS | 5 Xanthan Gum |
| 30 beta-1,4 glucan | 50 HCS | 20 Xanthan Gum |

Other carbohydrate sweeteners useful in carrying out the invention include fructose, lactose, maltose, invert sugar, molasses, corn syrup solids, dextrins, maltodextrins and galactose.

All of the foregoing compositions, both two-component and three-component were evaluated in ice cream, frozen yogurt, sherberts and a typical ice milk formulation as follows, wherein the beta-1,4 glucan component constituted 0.80% of the formulation:

| | |
|---|---|
| Milk solids non-fat | 13% |
| Sucrose | 12% |
| Corn syrup solids | 5% |
| Butter fat | 4% |
| Emulsifier | 0.20% |
| Beta-1,4 glucan (stabilizer) | 0.80% |
| Water | 65% |

The ingredients of the three-component system can be varid in amounts through a fairly wide range. Thus, the beta-1,4 glucan can vary from about 30% to about 80% of the weight of the powder, the carbohydrate sweetener can range from about 10% to about 65% and the hydrocolloid gum from about 5% to about 20%. The single most effective composition appears to be 60% beta-1,4 glucan, 30% HCS and 10% xanthan gum.

The two-component additive, namely the carbohydrate sweetener and the hydrocolloid gum may be introduced to and associated with the beta-1,4 glucan in several ways but always before the newly released and attrited beta-1,4 glucan is fully dried. The sweetener and gum may be added as a dispersion to the aforementioned filter cake of beta-1,4 glucan and the three components then attrited and bulk dried followed by grinding the bulk dried mass into powder form. On the other hand beta-1,4 glucan filter cake may be attrited after the addition of sufficient water and the sweetener and gum added to the attrited dispersion, after which the dispersion is spray dried to produce a powder the individual particles of which consist of beta-1,4 glucan having intimately associated therewith the carbohydrate sweetener and the hydrocolloid gum. Intimate mixing of the three components in the wet state followed by co-drying is necessary to produce a powder which upon reconstitution in an aqueous system provides a colloidal dispersion of beta-1,4 glucan particles which functions as a stabilizer in frozen dairy type foods and enhances both body and texture.

I claim:

1. The method of making a water-dispersible powder capable of functioning as a stabilizing agent and enhancing the body and texture of frozen dairy type foods, comprising intimately admixing in a wet state disintegrated beta-1,4 glucan with a carbohydrate sweetener and a hydrocolloid gum selected from guar gum, locust bean gum, gum arabic, sodium alignate, propylene glycol alginate, carrageenan, gum karaya and xanthan, and drying the mixture to form a powder constituted by weight from about 30% to about 80% beta-1,4 glucan, from about 10% to about 65% carbohydrate sweetener and from about 5% to about 20% hydrocolloid gum.

2. The method set forth in claim 1 wherein the carbohydrate sweetener is a hydrolyzed cereal solid.

3. The method set forth in claims 1 or 2 wherein the beta-1,4 glucan constitutes about 60% of the weight of the powder, the carbohydrate sweetener constitutes about 30% of the weight of the powder, and the hydrocolloid gum constitutes about 10% of the weight of the powder.

4. A water-dispersible powder made by the method of claims 1 or 2.

* * * * *